United States Patent [19]

Dehner

[11] Patent Number: 4,707,786
[45] Date of Patent: Nov. 17, 1987

[54] COMPUTER TOMOGRAPHY SYSTEM AND METHOD FOR OPERATING SAME

[75] Inventor: Guenter Dehner, Erlangen, Fed. Rep. of Germany

[73] Assignee: Siemens Aktiengesellschaft, Berlin and Munich, Fed. Rep. of Germany

[21] Appl. No.: 666,247

[22] Filed: Oct. 29, 1984

[30] Foreign Application Priority Data

Nov. 23, 1983 [DE] Fed. Rep. of Germany ....... 3342353

[51] Int. Cl.$^4$ ............................................. G06F 15/42
[52] U.S. Cl. .................................... 364/414; 378/901; 382/6
[58] Field of Search .................. 364/414, 724; 382/54, 382/6; 378/21, 901, 4, 156

[56] References Cited

U.S. PATENT DOCUMENTS

| | | | |
|---|---|---|---|
| 4,135,247 | 1/1979 | Gordon et al. | 364/414 |
| 4,189,775 | 2/1980 | Inouye et al. | 364/414 |
| 4,386,430 | 5/1983 | Treiber | 364/724 |
| 4,389,540 | 6/1983 | Nakamura et al. | 364/724 |
| 4,494,214 | 1/1985 | Bernard et al. | 364/724 |
| 4,524,424 | 6/1985 | White | 364/724 |
| 4,535,417 | 8/1985 | Peacock | 364/724 |
| 4,554,633 | 11/1985 | Glover et al. | 364/414 |
| 4,562,437 | 12/1985 | Sasaki et al. | 364/724 |
| 4,573,135 | 2/1986 | Dieterich | 364/724 |

FOREIGN PATENT DOCUMENTS

1577046 10/1980 United Kingdom ................ 378/901

OTHER PUBLICATIONS

Frank Zimmermann, "A State Variable Approach to Digital Image Processing", Oct. 1973.
"Suppression of Ring Artefacts in CT Fan-Beam Scanners", Kowalski, IEEE Transactions on Nuclear Science, vol. NS-25, No. 5, Oct. 1978, pp. 1111-1116.
"A modified convolution reconstruction technique for divergent beams", Webb, Phys. Med. Biol., 1982, vol. 27, No. 3, pp. 419-423.

Primary Examiner—Jerry Smith
Assistant Examiner—Kimthanh Tbui
Attorney, Agent, or Firm—Hill, Van Santen, Steadman & Simpson

[57] ABSTRACT

A computer tomography system has an X-ray source and a radiation receiver having an array of individual detectors each forming an electrical signal corresponding to the received radiation intensity, the X-ray source being rotated about a subject for transradiating a layer of the subject from different directions, and a measured value processing circuit to which the output signals of the individual detectors are supplied and which identifies therefrom attenuation values of predetermined points in the transradiated plane of the subject for generating a display image. The measure value processing circuit has a convolution computer, and further has an adaptive digital filter and a filter control unit to which the signals from the array are supplied before being operating on by the convolution computer. The filter control unit controls the transfer function of the filter as a function of the filter input signal so as to substantially reduce image artifacts due to quantum and electronics noise.

8 Claims, 7 Drawing Figures

COMPUTER TOMOGRAPHY SYSTEM AND METHOD FOR OPERATING SAME

BACKGROUND OF THE INVENTION

1. Field of the Invention

The present invention relates to computer tomography, and in particular to a computer tomography system and a method for operating same.

2. Description of the Prior Art

A computer tomography signal processing system is described in U.S. Pat. No. 4,135,247 having an X-ray source and receiver, the X-ray source emitting a fan-shaped X-ray beam which is incident on an array of individual detectors comprising the receiver, each detector forming an electrical signal corresponding to the received radiation intensity as the X-ray source is rotated around an exposure subject for transradiating a layer of the subject in the X-ray beam plane from different directions. The processing circuitry to which the output signals of the individual detectors obtained from the different transradiation directions are supplied identifies the attentuation values of predetermined points in the transradiated plane of the subject, and includes an image reproduction means for pictoriallly reproducing the calculated attenuation values. The processing circuit also includes a convolution computer for the measured data derived from the detector signals and an image reconstruction computer for generating a visual image from the received data.

In the known system described above, the convoluted signals contain at least two noise components, i.e., fluctuations of the measured values due to the finite quantum number (quantum noise) and noise stemming from the measuring electronics (electronics noise). Each of these noise components behaves differently as a function of the signal amplitude, and may cause image artifacts.

SUMMARY OF THE INVENTION

It is an object of the present invention to provide a computer tomography system and a method for operating the system wherein image artifacts due to quantum and electronics noise are reduced to a minimum.

The above object is inventively achieved in a computer tomography system and method for operating the system wherein the measured data are first supplied to an adaptive filtering means before convolution of the measured data. The signals from the receiver array are supplied to an adaptive digital filter equipped with a control unit which controls the transfer function of the filter in dependence upon the input signal supplied to the filter (the input signal being simultaneously supplied to the control unit). Because the filter is operated as a function of the filter input signal thereby permitting the transfer function of the filter to adapt to the amplitude and noise content of the input signal, the effects of both quantum and electronics noise on the image quality are substantially reduced.

DESCRIPTION OF THE PREFERRED EMBODIMENTS

Figure 1:
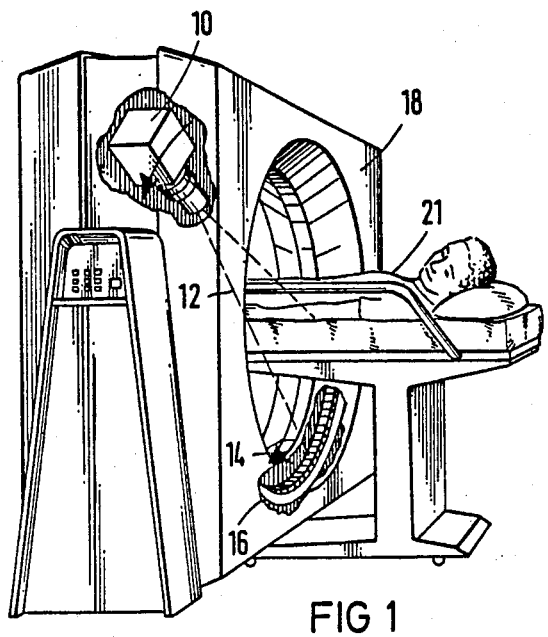
FIG. 1 is a prospective view of the arrangement of an X-ray source, a receiver array and an examination subject in a computer tomography system constructed in accordance with the principles of the present invention.
Figure 2:
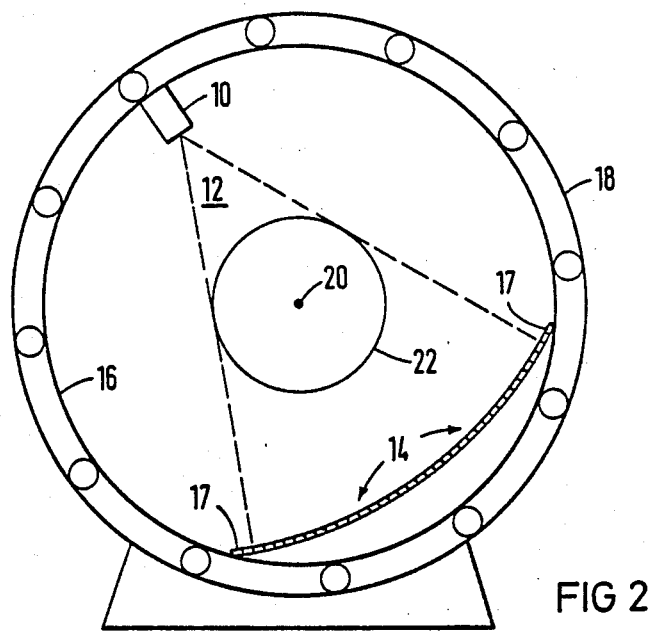
FIG. 2 is a front elevational view of the arrangement shown in FIG. 1.

A computer tomography apparatus constructed in accordance with the principles of the present invention is shown in FIG. 1. The apparatus has a radiation source 10, which may be an X-ray source, which emits a fan-shaped beam 12 which is incident on a detector array 14. The detector array 14 consists of a plurality of individual detectors adjacently disposed in a curved row. The detectors are arranged on a circle having a center in the radiation source 10. In a preferred embodiment, 512 detectors are employed which generate data from which the final tomography image is formed. The array additionally includes four monitor detectors 17, with two such monitor detectors being disposed at each end of the array 14. The monitor detectors 17 receive unattenuated radiation from the source 10 in a manner described in greater detail below. A front view of the apparatus shown in FIG. 1 is schematically represented in FIG. 2.

The radiation source 10 and the detector array 14 are disposed on an inner ring 16 of a supporting frame such that the radiation source 10 and the detector array 14 are held in a fixed positional relationship with respect to each other. The inner ring 16 is rotatably mounted within an outer ring 18, such that the inner ring 16 with the radiation source 10 and the detector array 14 can be rotated around a central axis 20, which is perpendicular to the plane of the fan-shaped beam 12. The fan-shaped beam 12 irradiates a circular region which is defined by the circle 22 when the inner ring 16 of the frame is rotated through 360°, the irradiation angle constantly changing during such rotation. An examination subject 21 is disposed within the circle 22 and the radiation which penetrates the circle 22 is incident on the 512 detectors of the detector array 14. The monitor detectors 17 are disposed such that radiation incident thereon has proceeded outside of the circle 22. The radiation incident on the monitor detectors 17 provides an indication of the unattenuated radiation intensity of the source 10 for every projection.

The radiation angle for the radiation source 10 in the circle 22 which includes the stationary examination subject 21 is called the projection angle. A tomographic scanning of a patient or some other subject disposed within the circle 22 is achieved by processing the data generated by the detectors in the detector array 14 at a plurality of different projection angles, with an image being constructed from the processed data. The image is representative of the cross-sectional region of the patient or other subject which lies within the plane of the fan-shaped beam 12.

The procedure described above is repeatedly executed during rotation of the source 10 and the detector array 14 around the stationary patient 21. In this embodiment, the ring 16 executes a complete revolution in approximately five seconds. A projection of the subject layer to be measured is made at every degree of the rotation, so that 360 separate sets with 512 data entries each are generated in such a scan. The data is processed as described below in order to generate the final displayed image.

Figures 3, 4:
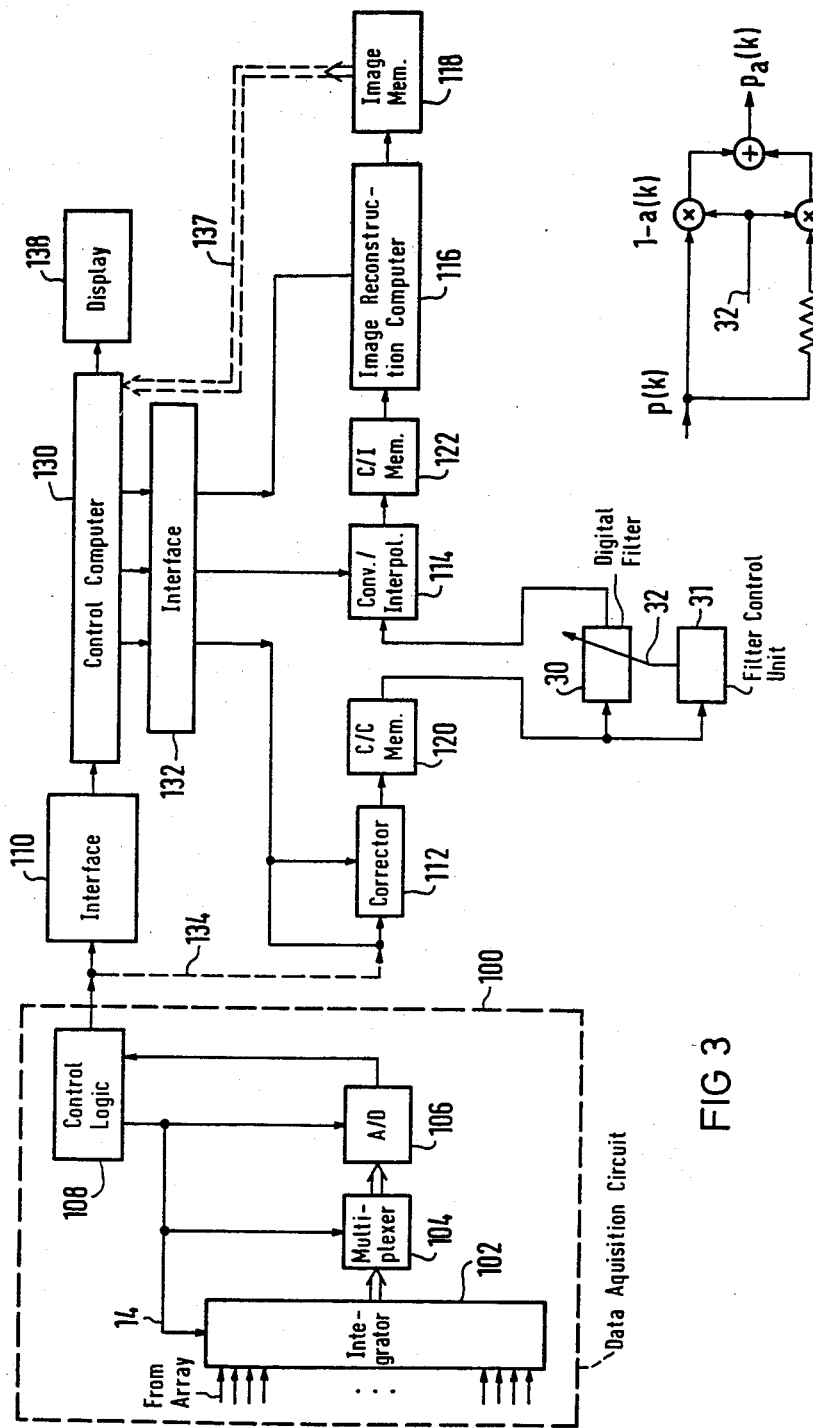
FIG. 3 is a block diagram of the processing circuitry for a computer tomography system constructed in accordance with the principles of the present invention.
FIG. 4 is a circuit diagram of one embodiment of an adaptive digital filter for use in the circuit shown in FIG. 3.

Circuitry constructed in accordance with the principles of the present invention for processing the data from the array 14 is shown in FIG. 4. Operation of such a data processing system, without the digital filter 30 and the filter control unit 31, is described in detail in the aforementioned U.S. Pat. No. 4,135,247, the teachings of which are incorporated herein by reference. Therefore only a general overview of the operation of the circuit shown in FIG. 3 is provided herein.

As shown in FIG. 3, the circuitry is divided into two sections, the first being a data acquisition circuit 100, indicated by dashed lines, which is disposed on the inner ring 16 so that it rotates together with the detector array 14 and the radiation source 10. The remainder of the circuit shown in FIG. 3 outside of the dashed lines is the processing circuitry and is stationary. The data acquisition circuit 100 should be disposed as close as possible to the detector array 14 in order to maintain unwanted signals and other noise as low as possible.

The output of every detector in the detector array 14 is supplied to an integrator 102 allocated thereto. Thus 512 data detector integrators and four monitor detector integrators are provided. The outputs of the integrators are conducted to a multi-channel analog multiplexer 104. The multiplexer 104 selectively connects the integrator outputs to a logarithmic analog-to-digital converter 106.

The integrators 102, the multiplexer 104 and the analog-to-digital converter 106 are controlled by signals from a data acquisition control logic unit 108. The digital data from the converter 106, representing the detector output signals, are supplied to the control logic 108, which transmits this data through a cable connecting the movable data acquisition circuit 100 to the remainder to the processing circuitry.

After the data from each detector have been converted into digital form and transmitted, the various operations and calculations which must be executed utilizing such data in order to form the final image or undertaken in a high-speed pipeline processor. The pipeline processor includes four function units: a corrector 112, a convolution computer/interpolator 114, an image reconstruction computer 116, and an image memory 118. A number of the stages themselves have an internal pipeline processing configuration. By means of step-by-step execution of the necessary computational operations in each of these pipeline stages, the processor executes its function in real time. As the data is required.

The data are supplied from the data acquisition circuit 100 to a frame-computer interface 110. This interface checks the data from the acquisition circuit 100 with respect to their format, and stores the data in the memory of a control computer 130 by direct memory access. When the corrector 112 is ready to receive new data, such data is supplied to the corrector 112 by the computer 130 via a computer-processor 132. Data transfer from the circuit 100 to the corrector 112 takes place through the computer 130 in order to facilitate storage of the raw data, if desired, and in order to permit calibration calculations to be executed by the computer 130 in accordance with calibration data, as described below.

It is possible, however, that the data may be supplied directly from the data acquisition circuit 100 to the corrector 112 where it is undesirable or unnecessary to have the data go through the memory of the computer 130, as indicated by the dashed line 134.

The data supplied to the corrector 112 consists of digital values which are representative of the log rhythm of the detector output signals. The corrector 112 executes a number of different operations utilizing this data. Data from the monitor detectors are utilized to compensate for variations in individual detector sensitivity and channel amplification, offsets in the intervening electronics, and variations in the X-ray intensity from projection to projection. The computer 130 calculates calibration values from this data, the calibration data being stored and supplied later to the corrector 112 through the interface circuit 132. The detector output data are not a linear function of the density of the subject through which the radiation has passed, as a result of the radiation hardening effect. A hardening correction is therefore also undertaken by the corrector 112. Finally, the corrected signals are multiplied by the cosine of the angle between a particular detector and a central detector. This is necessary because of the mathematical functional which allocates the measured data to the final image.

The corrected data are stored in a C/C memory 120. After storage in the memory 120, the data of a projection are accessible for processing in a convolution computer/interpolator 114. The convolution computer 114 operates on the series of corrected input data with a function which eliminates blurs (deblurring function) to prepare the data for image reconstruction. The convolution function can be varied by the operating personnel, for example, as a function of the desired characteristics of the final image. For this purpose, a plurality of convolution functions are stored in the computer 130. Dependent upon the selection of one of these functions by the operator, the computer 130 transmits data representative for this function to the computer 14 via the interface 32. This occurs before the beginning of a tomographic scan. The convolution function which eliminates the blurs consists of 512 words having 24 bits each.

The output signal of the convolution computer 14 consists of 512 data points. The interpolator portion of the computer 114 accepts this data and supplies eight points of interpolated data from each of the 512 data points. This occurs by means of seven additional data points being generated for each of the original data points. The additional data points are calculated by means of linear interpolation between each of the original data points. The convoluted and interpolated data are then stored in a C/I memory 122 and are thus available for calling by an image reconstruction computer 116 which reconstructs an image from the data from each of the exposures and supplies digital information for generating such an image to an image memory 118. A high-speed pipeline processor is utilized as the image reconstruction computer 116 which undertakes the reconstruction calculations in an extremely short time, so that the final image is available immediately after a scan event. The image computer requires that certain constants be stored or calculated before execution of the image reconstruction calculations for even scan. Generally, these projection constants are stored in the computer 130 and are calculated by the computer 130 and are transmitted to the image reconstruction computer 116.

During this projection, the image reconstruction computer 116 defines the corresponding data for each of the points in the 512×512 image matrix and multiplies them by a weighting function. The output signal of the image reconstruction computer for each projection has as many words as image points. These values are added to partial image data which has previously been stored in the image memory 18. The image memory 18 cntains 512×512 words of 16 bits each. After a scan has been concluded, the data stored in the image memory 118 are representative of the density of the cross-sectional region which has been scanned.

The image data from the image memory 18 can be displayed in various ways. In a preferred embodiment, these data are read by the computer 130, as indicated by the dashed line 137, whereby certain functions employing these data can be executed by the computer 130, for example, increasing or reducing the dynamic range of the gray scale in the image. The computer 130 then supplies the processed data to a display unit 138.

The memory 120 and the memory 122 are in the form of double-bank memories. While the corrector 112 is writing corrected data from a projection into one bank of the memory 120, the convolution computer 14 is reading the data of the preceding projection from the other bank of the memory 120. Five-hundred and twelve words of 15 bits each are written into one bank of the memory 120 or read from the other bank thereof during every scan. Similarly, the memory 122 is a double-bank memory. The interpolator stage of the computer 114 generates eight intermediate values, as described above, for each convoluted data point and the eighteen most significant bits of the result of each convolution and interpolation are retained. Thus 4,096 words of 16 bits each are written into each of the two memory banks of the C/I memory 122 and are read therefrom during each projection.

In accordance with the principles of the present invention, an adaptive filtering takes place before each convolution in the convolution computer 14 in order to eliminate noise influences, such as quantum and electronics noise. For this purpose, an adaptive digital filter 30 is provided between the C/C memory 120 and the convolution computer 114, as is a filter control unit 31 to which the filter input is also supplied from the memory 120. The filter control unit 31 controls the transient response, or transfer function, of the filter 30 as a function of the filter input signal as described in detail below.

Relationship of Electronics Noise to Quantum Noise

If the attenuation A(k) is defined by the expression $I_o/I(k)$ wherein $I_o$ is the unattenuated radiation intensity (before striking the examination subject) and I(k) is the attenuated measured value, the noise-free projection value p(k) supplied by the C/C memory 120 is calculated by the equation $$p(k) = C \ln \frac{I_o}{I(k)}. \qquad (1)$$

For real systems the measured value deviates from the above theoretical value by quantum noise, due to that finite number of quanta, and by electronics noise, due to the analog signal amplifier. The following model is assumed for identification of the noise sources. The attenuated measured value I(k) includes quantum noise $\sigma_Q r_Q(k)$ and electronics noise $\sigma_E r_E(k)$, therefore a theoretical intensity value $\bar{I}(k)$ can be written as follows:

$$\bar{I}(k) = I(k) + \sigma_Q r_Q(k) + \sigma_E r_E(k). \qquad (2)$$

The following expressions are assumed for the variance of the white noise functions $r_Q(k)$ and $r_E(k)$:

$$VAR\{r_Q(k)\} = VAR\{r_E(k)\} = 1. \qquad (3)$$

The variance and the standard deviation of the two independent noise sources are defined by the factors $\sigma_Q$ and $\sigma_E$. The magnitude of the quantum noise depends on the square root of the unattenuated intensity I(k), therefore the following expression applies for the quantum noise:

$$\sigma_Q = C_1 \sqrt{I(k)} = C_1 \sqrt{I_o} \, e^{-\frac{p(k)}{2C}} = C_1 \sqrt{\frac{I_o}{A(k)}}. \qquad (4)$$

It is assumed that the electronics noise is independent of the unattenuated intensity I(k) and of the attenuation factor A(k), therefore the variance of the electronics noise is constant. In order to relate the electronics noise to the quantum noise, it is assumed for a special CT system that the electronics noise is equal to the quantum noise at an attenuation factor $A(k) = A_{QE}$ defined as the attenuation limit. The following expression then applies for the standard deviation of the electronics noise $\sigma_E$:

$$\sigma_E = C_1 \sqrt{\frac{I_o}{A_{QE}}}. \qquad (5)$$

The influence of the two noise sources is charcterized by ratio of electronics noise to quantum noise referenced F(k). This value depends on the projection value p(k) and therefore can be written as a function of k. Utilizing equations (4) and (5) yields:

$$F(k) = F(p(k)) = \frac{\sigma_E}{\sigma_Q} = A_{QE}^{-\frac{1}{2}} e^{\frac{p(k)}{2C}}. \qquad (6)$$

The terms C and $C_1$ above are constants. Determination of the attenuation limit $A_{QE}$ depends upon the radiation system employed. Accordingly, for the projection values p(k) a limit value $p_{QE}$ at which the electronics noise is assumed to be equal to the quantum noise is obtained for F=1. Applying the above assumption to equation (6) yields:

$$p_{QE} = C \ln A_{QE}. \qquad (7)$$

Design of the Adaptive Filter

Figure 5:
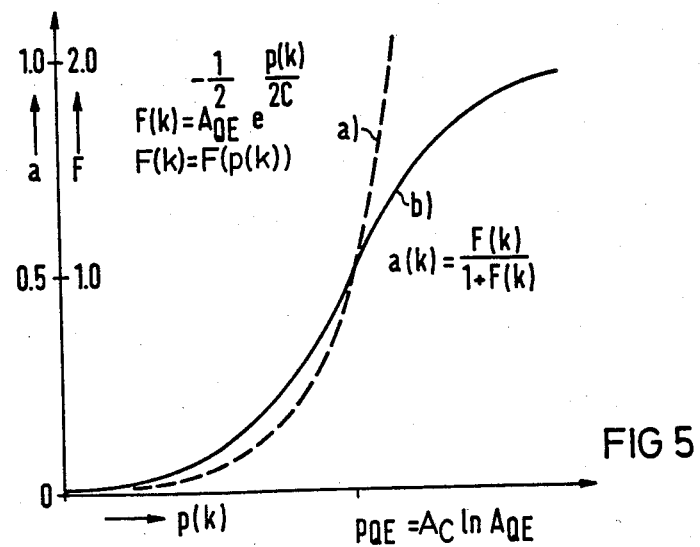
FIG. 5 and FIG. 6 are graphs for explaining the operation of the processing circuitry.

The relationship $F(k) = F(p(k))$ of electronics noise to quantum noise as a function of the projection values p(k) is shown in FIG. 5 designated as curve a. In order to reduce influence of the electronics noise on the reconstructed image, the projection values p(k) for which $F(k) = F(p(k)) > 1$ (or $p(k) > p_{QE}$) should be filtered as much as possible, however those projection values in the range F(k) < 1 (or $p(k) < p_{QE}$) should be filtered as little as possible, preferably left unchanged. The effect of smoothing the large projection values only can be achieved by an adaptive digital filter.

Realization of such a transfer function for the filter 30 is achieved with the digital filter shown in FIG. 4. The filtered and unfiltered signals are thereby added to each other in the relationship F(k) according to equation (6). With the step response for the non-recursive low pass filter being designated $h_{TP}(v)$, the filter output $p_a(k)$ is defined by the following expression:

$$p_a(k) = \frac{1}{1+F(k)} p(k) + \frac{F(k)}{1+F(k)} \{p(k) * h_{TP}(v)\}. \tag{8}$$

An adaption coefficient a(k) is utilized with the following value:

$$a(k) = \frac{F(k)}{1+F(k)}. \tag{9}$$

Since F(k) depends upon the projection values p(k) (see equation (6)), a(k) is also a function of p(k). Curve b in FIG. 5 shows a(k)=a(p(k)) as a function of p(k). Substituting the value for a(k) of equation (9) into equation (8) yields for the filtered output signal:

$$p_a(k) = p(k) + a(k)(p_{TP}(k) - p(k)), \tag{10}$$

wherein $p_{TP}(k)$ is the low pass filtered signal. In accordance with equation (10) the signal-dependent transfer function $H_a(\Omega)$ is obtained as a function of the adaption coefficient a as follows:

$$H_a(\Omega) = (1-a) + a H_{TP}(\Omega), \tag{11}$$

wherein $\Omega = 2\pi f/f_a$, and $f_a$ is the sampling rate of the digital signal.

Since the adaption coefficient changes from one sample of the input signal to another, the system cannot be described by one frequency response. The frequency response changes from one curve of FIG. 6 to another according to the adaption coefficients $a=a(k)=a(p(k))$. Therefore for small projection values the signal is nearly unchanged, while large signals result in a smoothed, low-pass filtered output signal.

Low-Pass Filter

In order to obtain a steadily decreasing frequency response for the filter 30 with increasing measured values p(k) and thus increasing a(k) at high frequencies, i.e., $$H_a(\Omega)|a_2 < H_a(\Omega)|a_1 \text{ for } \begin{array}{c} o \leq \Omega \leq \pi \\ a_2 > a_1 \end{array}, \tag{12}$$

it is preferable to select a low pass filter with n-fold zero setting at $\Omega = \pi$. In order to avoid distortions, a linear phase filter may be employed, that is, a filter wherein $$h_{TP}(-v) = h_{TP}(v). \tag{13}$$

Testing has shown that at least five coefficients are necessary for adequate smoothing. The function $H_{TP}(\Omega)$ is therefore selected as:

$$H_{TP}(\Omega) = \cos^4 \frac{\Omega}{2}. \tag{14}$$

The corresponding values for the step response are:

$$h_{TP}(v) = \left\{ \frac{1}{16}, \frac{1}{4}, \frac{3}{8}, \frac{1}{4}, \frac{1}{16} \right\}. \tag{15}$$

Utilizing equation (11) the signal-dependent transfer function of the adaptive filter is expressed as:

$$H_a(\Omega) = 1 - a + a \cos^4 \frac{\Omega}{2}. \tag{16}$$

Figure 6:
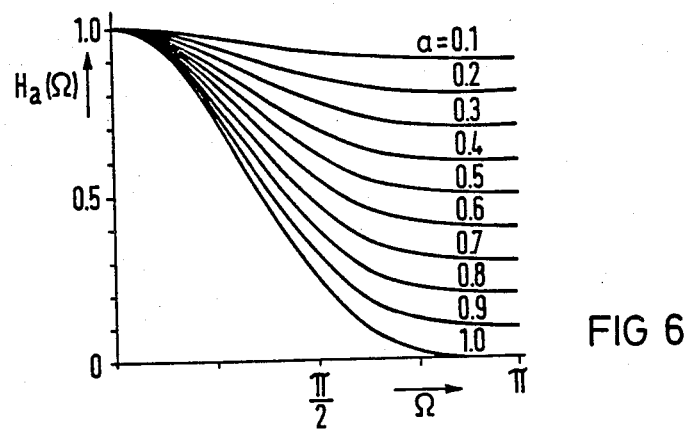

FIG. 6 shows $H_a(\Omega)$ for different adaption coefficients. Utilizing equation (15) the signal-dependent step response $h_a(v)$ has the following values:

$$h_a(v) = \left\{ \frac{a}{16}, \frac{a}{4}, 1 - \frac{5}{8}a, \frac{a}{4}, \frac{a}{16} \right\}. \tag{17}$$

Realization of the Adaptive Digital Filter

Figure 7:
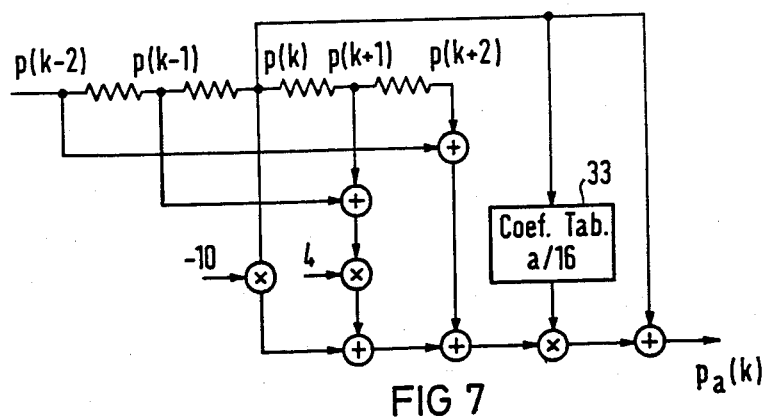
FIG. 7 is a schematic diagram of another embodiment of an adaptive digital filter for use in the circuit shown in FIG. 3.

The adaptive digital filter 30 may be realized in one embodiment as shwn in FIG. 4 with the values for the function a(k) being supplied to the multipliers via a control line 32 from the filter control unit 31. For parallel operation and to avoid divisions and calculations of exponential functions, the values for the adaption coefficients a may be stored in a table 33 as shown in FIG. 7 as a function of the projection values p at addresses in accordance with equations (6) and (9) for an equidistant grid of samples within the range of possible projection values, i.e., values of the adaptive filter input. The pre-calculated values are stored in a PROM table 33 as shown in FIG. 7 and can be referenced by PROM addresses. The addresses can be generated by scaling the input signal directly. To reduce the calculation steps for the digital filter, described by the step response tin equation (7), the structure of the filter is rearranged in FIG. 7.

Although modifications and changes may be suggested by those skilled in the art it is the intention of the inventor to embody within the patent warranted hereon all changes and modifications as reasonably and properly come within the scope of his contribution to the art.

I claim as my invention:

1. In a method for operating a computer tomography system including the steps of rotating a fan-shaped radiation beam around an examination subject, said radiation being incident on a detector array consisting of a plurality of individual detectors, each said detector generating an electrical signal corresponding to the intensity of radiation incident thereon, processing said signals for generating an image of the plane of the examination subject within said fan-shaped radiation beam including correcting said signals from said detectors to provide corrected data points, convolving said data points with a deblurring function to provide convolved data points, and reconstructing said image from said convolved data points, the improvement comprising the steps of:

filtering said corrected data points in an adaptive digital filter to which said corrected data points are supplied as input signals before convolving said corrected data points, said filter having a transfer function; and continuously controlling the transfer function of said filter as a function of the input signals of said filter for suppressing noise in said input signals.

2. The improvement of claim 1 wherein the step of continuously controlling said transfer function of said filter is further defined by continuously controlling the transfer function of said filter for suppressing quantum noise and electronics noise in said input signals.

3. The improvement of claim 2 wherein the step of filtering said corrected data points is further defined by the steps of:

subjecting said input signals to low-pass filtering;

multiplying the low-pass filtered signals by an attenuation factor to obtain a first product;

multiplying said input signals by one minus said attenuation factor to obtain a second product; and adding said first and second products to form a filter output signal.

4. The improvement of claim 3 wherein said attenuation factor is selected as $F(k)/1+F(k)$ wherein $F(k)$ is $A_{QE}-\frac{1}{2}e^{p(k)/2C}$ wherein $A_{QE}$ is a limit attenuation at which said quantum noise is equal to said electronics noise, C is a constant, and $p(k)$ represents said input signals.

5. In a computer tomography system having a rotatable radiation source for directing a fan-shaped radiation beam around an examination subject, a detector array consisting of a plurality of individual detectors on which radiation from said radiation source is incident, each said detector generating an electrical signal corresponding to the intensity of radiation incident thereon, a means for processing said signals for generating an image of the plane of the examination subject within said fan-shaped radiation beam including corrector means for correcting said signals from said detectors to provide corrected data points, convolving means for operating on said corrected data points with a deblurring function to provide convolved data points, and image reconstruction means for reconstructing said image from said convolved data points, the improvement comprising:

an adaptive digital filter to which said corrected data points are supplied as input signals for filtering said corrected data points before convolving said corrected data points; and a filter control unit for continuously controlling the transfer function of said digital filter as a function of the input signals of said digital filter for suppressing noise in said input signals.

6. The improvement of claim 5 wherein said fitler control unit continuously controls the transfer function of said digital filter for suppressing quantum noise and electronics noise.

7. The improvement of claim 6 wherein said digital filter comprises:

a low-pass filter means to which said input signals are supplied for obtaining low-pass filtered signals;

first multiplier means for multiplying said low-pass filtered signals by an attenuation factor;

second multiplier means for multiplying said input signals by one minus said attenuation factor; and adder means for adding the products of said first and second multiplier means to form a filter output signal.

8. The improvement of claim 7 wherein said attenuation factor is selected as $F(k)/1+F(k)$ wherein $F(k)$ is $A_{QE}-\frac{1}{2}e^{p(k)/2C}$ wherein $A_{QE}$ is a limit attenuation at which said quantum noise is equal to said electronics noise, C is a constant, and $p(k)$ represents said input signals.

* * * * *